G. T. SMITH.
Mill-Stone Dress.
No. 166,419.
Patented Aug. 3, 1875.
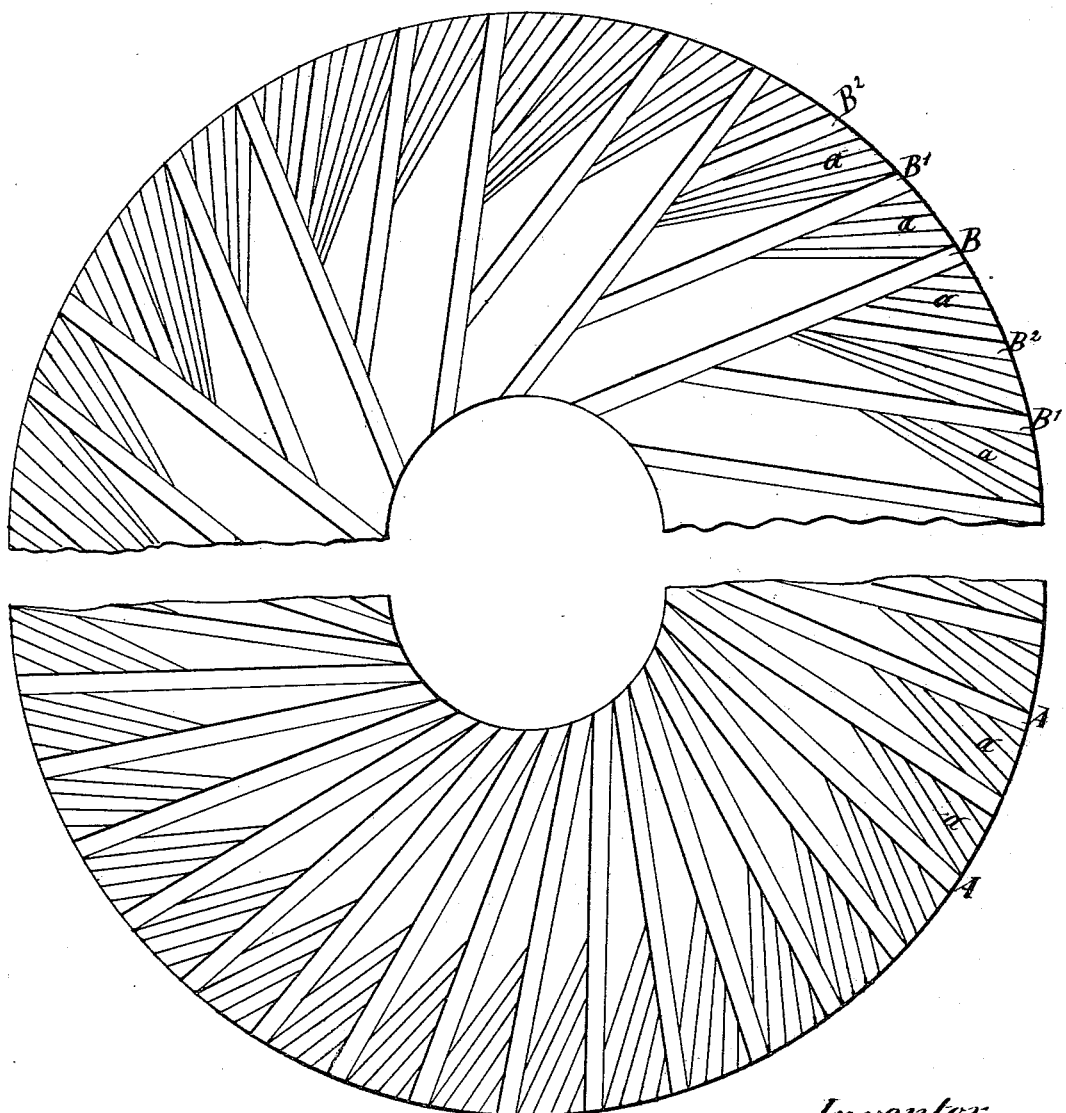
Witnesses
Henry Orth
Chas Jacobsen
Inventor:
George T. Smith
by H H Doubleday
atty.

UNITED STATES PATENT OFFICE.

GEORGE T. SMITH, OF MINNESOTA CITY, MINNESOTA.

IMPROVEMENT IN MILLSTONE-DRESS.

Specification forming part of Letters Patent No. 166,419, dated August 3, 1875; application filed May 28, 1875.

*To all whom it may concern:*

Be it known that I, GEORGE T. SMITH, of Minnesota City, in the county of Winona and State of Minnesota, have invented a new and useful Improvement in Millstone-Dress, which improvement is fully set forth in the following specification, reference being had to the accompanying drawing.

The object of my invention is to produce, by the first grinding of wheat, a large proportion of middlings of nearly uniform size or granulation, to avoid the necessity of unduly grinding any portion of the flour or bran, and, at the same time, to so thoroughly clean the bran that it shall not be necessary to regrind said bran in order to utilize satisfactorily the flour-producing part of the berry. To this end the invention consists in combining with the ordinary wide and deep furrows, which divide the face of the stone into lands, and which, for convenience in description, I prefer to call main furrows, a series of narrow and very shallow furrows, (which I designate middlings - furrows,) traversing the lands, and having a greater draft than the main furrows, as will be hereinafter fully explained.

In the drawings I have represented my invention as applied to stones having two of the different styles of dress which are usually employed in mills.

In the drawing I have shown my invention as applied to stones having each a different arrangement of lands and furrows.

In one stone the main furrows A are all arranged tangentially to one and the same circle, while in the other stone the face is first divided into quarters by means of master-furrows B, these being further subdivided into lands by means of the furrows B¹ B².

It is a fact generally understood that with a stone of four feet diameter, run at the ordinary speed, and with the usual amount of feed, a draft of about four and a half inches will produce the most satisfactory results—that is to say, the main furrows A or B should be formed on a line tangential to a circle having a radius of four and a half inches from the eye of the stone. Any amount of draft greatly exceeding this is liable to pass the grain from the stone before it is sufficiently comminuted, and without sufficiently cleaning the bran, as the greater the draft in the furrows the shorter the time that the meal will remain under the stone, all other things being equal.

Having decided to adopt a four-and-a-half-inch draft for the main furrows in a four-foot stone, in order to properly clean the bran, my next object is to deliver the middlings and flour from between the stones without grinding them too fine; and in order to accomplish this I have added a series of middlings-furrows, represented by lines *a*, having a draft, on a four-foot stone, of about ten inches—that is to say, they are each laid out on a line tangential to a circle having a radius of ten inches in length from the eye of the stone. These middlings-furrows are narrow, say about one-quarter of an inch in width, and very shallow, say about one-thirty-second of an inch in depth at the back, being of the same form in transverse section as the ordinary main furrows A and B.

The operation of my invention is as follows: The grain is fed in at the eye of the stone, where it is broken and partially ground. As it passes over the skirt, the process of comminuting is carried on, and as fast as the flour-producing portion of the berry is detached from the bran, and is reduced to that size or condition of granulation commonly known as middlings, (some of it being reduced to fine flour,) it enters the middlings-furrows, and passes rapidly out from between the stones without receiving much additional grinding, and in a very cool, lively condition.

In consequence of the small size of these middlings-furrows, the bran does not enter them, and is not, therefore, carried off by them, but remains between the stones, and is acted upon by them much longer, and, hence, may be effectually cleaned.

The distance at which I place these middlings-furrows apart is usually determined by the texture or condition of the stone. For instance, upon an open stone I would ordinarily place them from three-eighths to five-eighths of an inch from each other, while upon a stone having a close face, with a large amount of grinding-surface, they might be advantageously placed a quarter of an inch apart. But I do not wish to be limited to any specific construction of these middlings-furrows, or to the precise arrangement of them relative to the main furrows or the lands, as these details may be somewhat changed without departing from the spirit of my invention.

I have shown the invention as being applied to two different styles of dress; but it is apparent that it may be used in connection with many others, and produce good results, without material change in its application, or in the principle of grinding involved therein.

What I claim is—

In combination with the main furrows A or B B[1] B[2], the middlings-furrows $a$, substantially as set forth.

GEORGE T. SMITH.

Witnesses:
   G. W. COLWELL,
   H. H. DOUBLEDAY.